(12) United States Patent
Nauert

(10) Patent No.: US 6,932,023 B1
(45) Date of Patent: Aug. 23, 2005

(54) COLLAPSIBLE SHADE FOR FEEDER ASSEMBLY

(76) Inventor: Uta Nauert, 7460 N. River Rd., Milwaukee, WI (US) 53217

( * ) Notice: Subject to any disclaimer, the term of this patent is extended or adjusted under 35 U.S.C. 154(b) by 2 days.

(21) Appl. No.: 10/709,597

(22) Filed: May 17, 2004

Related U.S. Application Data

(63) Continuation-in-part of application No. 29/185,780, filed on Jul. 2, 2003, now Pat. No. Des. 497,458.

(51) Int. Cl.[7] .............................................. A01K 39/02
(52) U.S. Cl. ........................................ 119/72; 119/61.5
(58) Field of Search ............................. 119/52.2, 52.3, 119/57.8, 57.9, 61.3, 61.5, 72

(56) References Cited

U.S. PATENT DOCUMENTS

| | | |
|---|---|---|
| 697,343 A | 4/1902 | Lathrop |
| 3,292,589 A | 12/1966 | Williams |
| 3,913,527 A | 10/1975 | Kilham |
| 4,030,451 A | 6/1977 | Miller |
| 4,031,856 A | 6/1977 | Chester |
| 4,102,308 A | 7/1978 | Kilham |
| 4,546,730 A * | 10/1985 | Holland ...................... 119/780 |
| 4,712,512 A | 12/1987 | Schreib et al. |
| 4,821,681 A | 4/1989 | Tucker |
| 4,901,673 A | 2/1990 | Overstreet |
| 5,062,390 A | 11/1991 | Bescherer et al. |
| 5,191,857 A | 3/1993 | Boaz |
| 5,269,258 A | 12/1993 | Brown |
| 5,454,348 A | 10/1995 | Colwell et al. |
| 5,507,249 A | 4/1996 | Shaw |
| 5,628,277 A | 5/1997 | Machado |
| 5,791,286 A | 8/1998 | Taussig et al. |
| 5,893,335 A | 4/1999 | Goodwin |
| D429,852 S | 8/2000 | Hogarty |
| 6,269,769 B1 | 8/2001 | Wenstrand |
| 6,418,950 B1 * | 7/2002 | Tseng ........................... 135/28 |

OTHER PUBLICATIONS

Perkey Pet Brand Hummingbird Feeder, no date, pp. 1-5.
Hummingbird Feeders, Hummingbirds.net, no date, pp. 1-8.
Wild Birds Unlimited, Your Backyard Bird Feeding Hobby Guide, no date, pp. 1-8.
Aspects, Wild Bird Feeders Thermometers and Accessories, 2000, pp. 1-16.

* cited by examiner

*Primary Examiner*—Robert P. Swiatek
(74) *Attorney, Agent, or Firm*—Ziolkowski Patent Solutions Group, SC

(57) ABSTRACT

A feeder assembly has a collapsible shade to selectively shield a feed container. The shade is operable from an extended position to a collapsed position and positioned such that, when extended, the shade substantially covers the feed container thereby limiting the impingement of direct sunlight or rain on the feed container. By limiting the amount of direct sunlight or rain impinged on the feed container, the freshness of the feed can be more efficiently maintained.

31 Claims, 3 Drawing Sheets

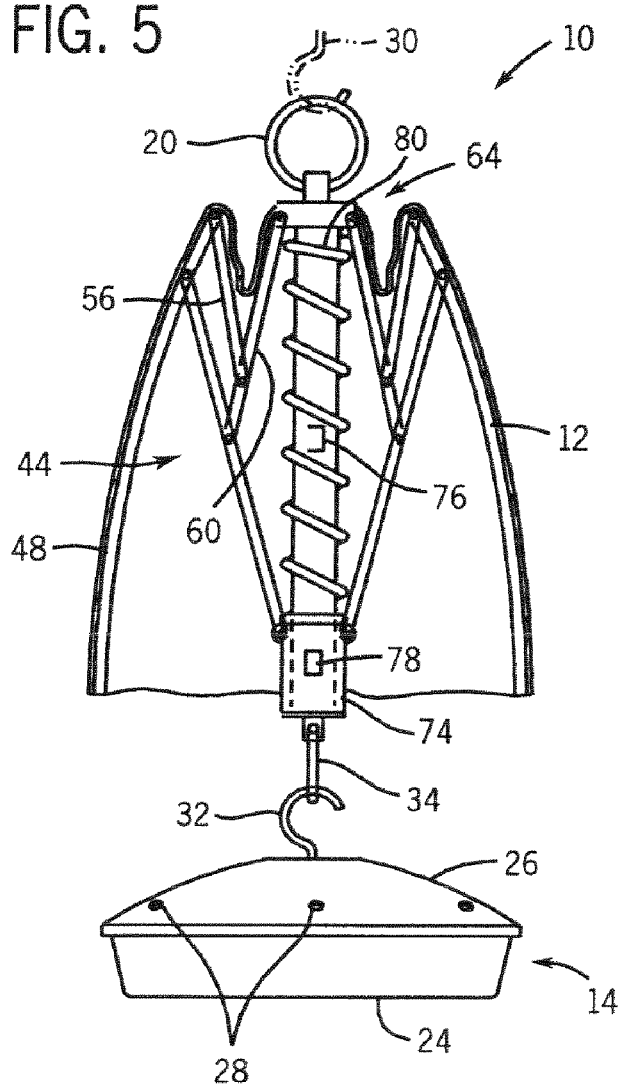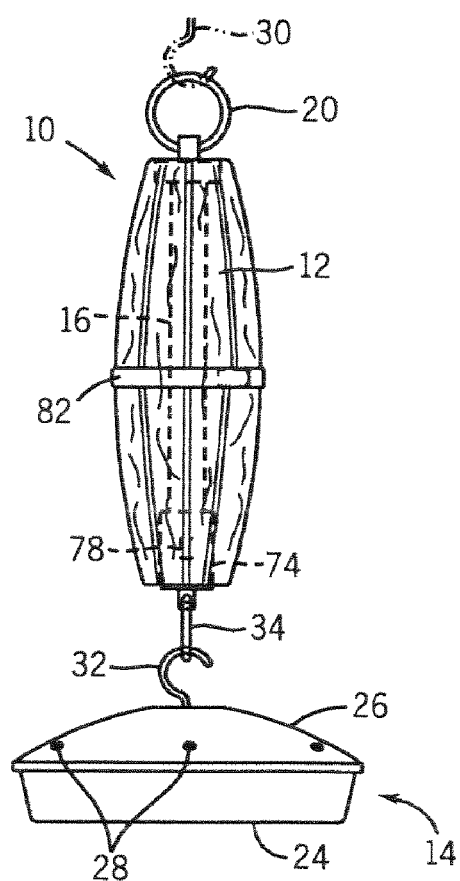

COLLAPSIBLE SHADE FOR FEEDER ASSEMBLY

CROSS REFERENCE TO RELATED APPLICATIONS

This application is a continuation-in-part of, and claims priority to U.S. Ser. No. 29/185,780, filed Jul. 2, 2003.

BACKGROUND OF INVENTION

The present invention relates generally to animal feeders, and more particularly, to a retractable shade for use with such feeders. The present invention is particularly useful with suspended feeders for providing shade and protection from inclement weather. Dry feeds, such as nuts and seeds, which are preferable to certain birds and squirrels, can prematurely spoil if exposed to adverse weather such as rain. Likewise, a nectar solution, preferable for attracting hummingbirds and generally contained in a reservoir, can become diluted if exposed to rain or can prematurely spoil if exposed to direct sunlight for extended periods of time.

Many individuals enjoy feeding and observing wildlife such as birds, hummingbirds, and squirrels. The animals are often observed in relative proximity to a feeder which is typically somewhere within view of a person's residence. As such, the feeders are often located in front of windows or located within garden areas. In an effort to maintain the integrity of the quality of feed contained in the dry-feed feeders, other dry-feed feeders have included a cover component. These cover components are not without their drawbacks. Some of the cover components hide the feed from the sight of birds that may be passing overhead or interfere with an animal's access to the feed. In an effort to increase the attractiveness of such feeders, other feeders include a cover that has some degree of transparency that allows birds to see the feed contained thereunder. Regardless of whether the cover component is opaque or has some degree of transparency, these cover structures reduce the accessibility of the animals to the feed contained within the feeder.

Conventional dry-feed feeders generally include some type of container constructed to be refilled with a feed such as nuts and seeds or any mixture thereof. Exposure of these feeds to moisture, such as rain, can prematurely spoil the feed and detract from the attraction of the animals thereto. Although these dry-feed containers are often constructed of a grated material to prevent the retention of water therein, cycles of wetting and drying of the feed can result in germination and/or premature degradation of the feed quality. Poor feed quality results in less animals being attracted to the feeder and reduces the duration of stay of animals that are attracted to the feeders.

Unlike dry-feed consuming animals, hummingbirds utilize a fluid "feed" material, or nectar. Hummingbird feeders generally include a reservoir with a base that is refillable and a top that is structured to accommodate the slender beak of a hummingbird. Hummingbird feeders are also adapted to prevent insects from infiltrating the feeder. Insects of particular concern include bees and wasps as well as ants as these insects are especially attracted to the sugar based fluid typically disposed in hummingbird feeders.

In an effort to prevent bees and wasps and other insects from feeding at the hummingbird feeder, hummingbird feeders have been adapted to prevent the insects from accessing the nectar placed in the reservoir by having specially adapted openings in the feeder that accommodate only the long slender beak of a hummingbird. Additionally, bees and wasps are particularly attracted to the color yellow; therefore, avoiding incorporation of yellow parts with a feeder helps to prevent bees and wasps from noticing the feeder despite having a sugar solution disposed therein. In contrast, hummingbirds are attracted to ultraviolet colors. As such, use of ultraviolet colors other than yellow is preferred to attract hummingbirds without attracting nuisance bees and wasps.

Other hummingbird feeders incorporate a moat in an effort to prevent crawling insects from feeding at the feeder. These moats are designed as a fluid reservoir such that crawling insects are required to cross the fluid filled reservoir in order to feed at the feeder. Other moat-based feeders implement a sticky substance that the insects must traverse in order to feed at the feeder. The purpose of this design is to cause the insects to stick in the sticky substance in the moat thereby preventing their feeding at the feeder.

Referring further to hummingbird feeders, the nectar of hummingbird feeders is usually sugar water and can vary in concentration from a ratio of approximately 1:1 to 1:5 parts sugar to water. If the proper amount of sugar is placed in the feeder, it will not require the addition of additives such as honey, brown sugar, fruit, or red food coloring to the fluid in order to attract hummingbirds. The higher the concentration of sugar to water placed in the feeder, the more attractive the feeder will be to hummingbirds. However, the higher the concentration, the less frequently those birds that are attracted to the feeder will need to feed. It has been suggested that once hummingbirds have been attracted to a feeder's position, the concentration of the liquid placed in the feeder reservoir can be reduced to more diluted concentrations in order to entice those hummingbirds that have been attracted to the feeder to feed more often.

In addition to the hummingbirds sensitivity to the concentration of the liquid placed in the feeder, hummingbirds are also particularly sensitive to the quality of the fluid in the feeder and may abandon a feeder that contains liquid that has spoiled. Spoilage can result from mold within the liquid reservoir, fermentation of the solution, or contaminants within the solution. A number of methods have been developed to extend the life of the fluid. For example, boiling the water to be used in the solution before measuring can retard spoilage of the liquid in the feeder by a day or two. Others suggest that using distilled water can also add to the life of the fluid. However, it has been suggested that distilled water may lack the minerals that hummingbirds need.

A significant accelerant to the spoilage of the hummingbird feed fluid is warm weather and direct sunlight. Some ornithologists have speculated that a hummingbird would starve rather than consume spoiled nectar. Certain nectar mixtures can spoil in as little as a few hours when exposed to direct sunlight in warm weather. Not only would the nectar require near-immediate replacement in order to maintain hummingbird feeding, the feeder itself should be thoroughly cleaned to avoid cross-contamination with the fresh nectar.

The preferred method for cleaning a hummingbird feeder is with hot tap water and a brush. Sometimes a black mold will appear within the feeder. This mold can be removed by soaking the entire feeder in a diluted bleach bath. Additionally, if the solution appears cloudy it has spoiled and will therefore no longer be consumed by hummingbirds. This process of cleaning the hummingbird feeder is time consuming. By extending the life of the nectar between filling and spoilage, the feeder will, as a result, require less cleanings.

Regardless of which animal is to be attracted to, and fed at, the feeder apparatus, it would be desirable to have a system and method of protecting the integrity of feed provided in a feeder by operatively providing shade/protection to a feed container/reservoir.

BRIEF DESCRIPTION OF INVENTION

The present invention provides a system and method of providing an operable, collapsible shade for a feeder assembly that overcomes the aforementioned drawbacks.

In accordance with one aspect of the present invention, a feeder assembly is disclosed that includes a feed container and a post having first and second ends, wherein the first end extends upwardly from the feed container. The feeder assembly also includes a shade pivotably attached about the second end of the post and movable between an open position and a closed position.

In accordance with a further aspect of the present invention, a bird feeding apparatus is disclosed that includes a hummingbird feeder having a liquid reservoir. The liquid reservoir has a plurality of openings to only accommodate feeding by a hummingbird. The apparatus also includes a collapsible hood positioned over the liquid reservoir and constructed to shade the liquid reservoir from direct sunlight. Additionally, the bird feeding apparatus includes a post connecting the liquid reservoir to the collapsible hood and a slider connected to the collapsible hood. The slider is movably connected to the center post and operable to open and close the collapsible hood.

According to yet another aspect of the invention, a bird feeder device is disclosed that includes a feeder having a reservoir constructed to feed hummingbirds. The device includes an umbrella connected to the feeder and extendable between a closed position and an open position generally above the reservoir.

In accordance with a further aspect of the presenting invention, a bird feeder is disclosed that includes means for retaining a sugar solution, means for providing shade to the means for retaining sugar solution, and means for operatively extending and retracting the shade providing means.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 5 is an elevational view of the feeder assembly shown in FIG. 4 with the hood partially collapsed.

FIG. 6 is an elevational view of the feeder assembly shown in FIG. 4 with the hood fully collapsed.

DETAILED DESCRIPTION

The present invention will be described with respect to a hummingbird feeder, but may be incorporated in other types of feeders where it is desirable to delay spoilage of the feed typically attributed to extended exposure to direct sunlight or exposure to inclement weather conditions such as rain.

Figure 1:
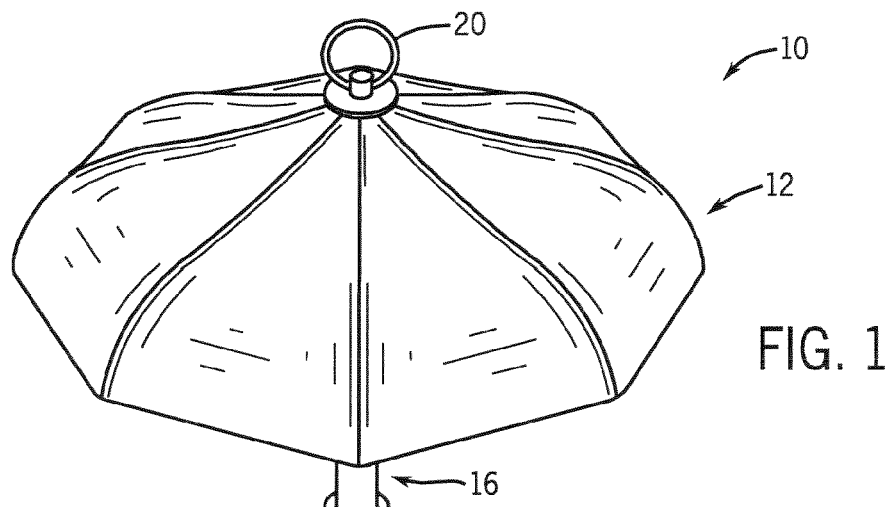
FIG. 1 is a perspective view of a feeder assembly according to the present invention.

FIG. 1 shows a feeder assembly 10 including a shade or hood 12, a reservoir 14, and a center post 16 connecting the hood to the reservoir. The feeder assembly includes a hanging loop 20 located above the hood 12. The hanging loop 20 is used to suspend feeder assembly 10 from a hook, a branch, or other suspension means. Hanging loop 20 can be attached to any means of hanging the feeder assembly in a desired location such as from a tree limb, yard stake, or the eave of a home. The fluid reservoir 14 is constructed to suspend from center post 16 below hood 12. As shown, a majority of reservoir 14 is protected by hood 12. Preferably, hood 12 is fabricated from an opaque, flexible material and therefore does not allow the passage of light therethrough. While construction of the hood from an opaque material is preferred, it is not necessary for implementation in areas prone to some shade as the advantage of the present invention can be achieved without a completely opaque hood.

Figure 2:
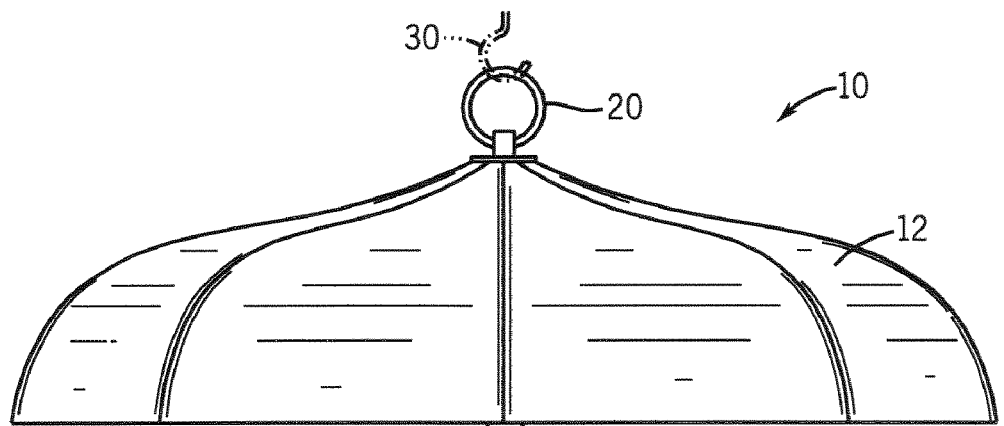
FIG. 2 is a side elevation view of the feeder assembly shown in FIG. 1.

Referring to FIG. 2, the profile of feeder assembly 10 shows the inverted bowl shape of hood 12 positioned above reservoir 14. The reservoir 14 includes a base 24 and a lid 26. Reservoir 14 is shown as a reservoir constructed to facilitate feeding of hummingbirds. It is understood that reservoir 14 could also be a feed container constructed to contain a dry feed preferable to other animals such as dry feed consuming birds or squirrels. As is readily apparent and will be discussed in greater detail below, the size of the hood 12 is much greater than the size of the reservoir 14. Preferably, hood 12 is at least twice as large as reservoir 14. The lid includes a plurality of openings 28 constructed of sufficient size to only accommodate feeding of a hummingbird. That is, openings 28 are designed to only receive the needle-like beak of a hummingbird. The feeder assembly is shown suspended from a hook 30, shown in phantom, inserted through loop 20 of center post 16 that extends from feeder assembly 10 above hood 12. Reservoir 14 includes a hook 32 extending therefrom and engaged with a loop 34 suspended from center post 16. Such a construction allows reservoir 14, or any feed container, to be expeditiously removed from hood 12 for convenient cleaning and refilling.

Figure 3:
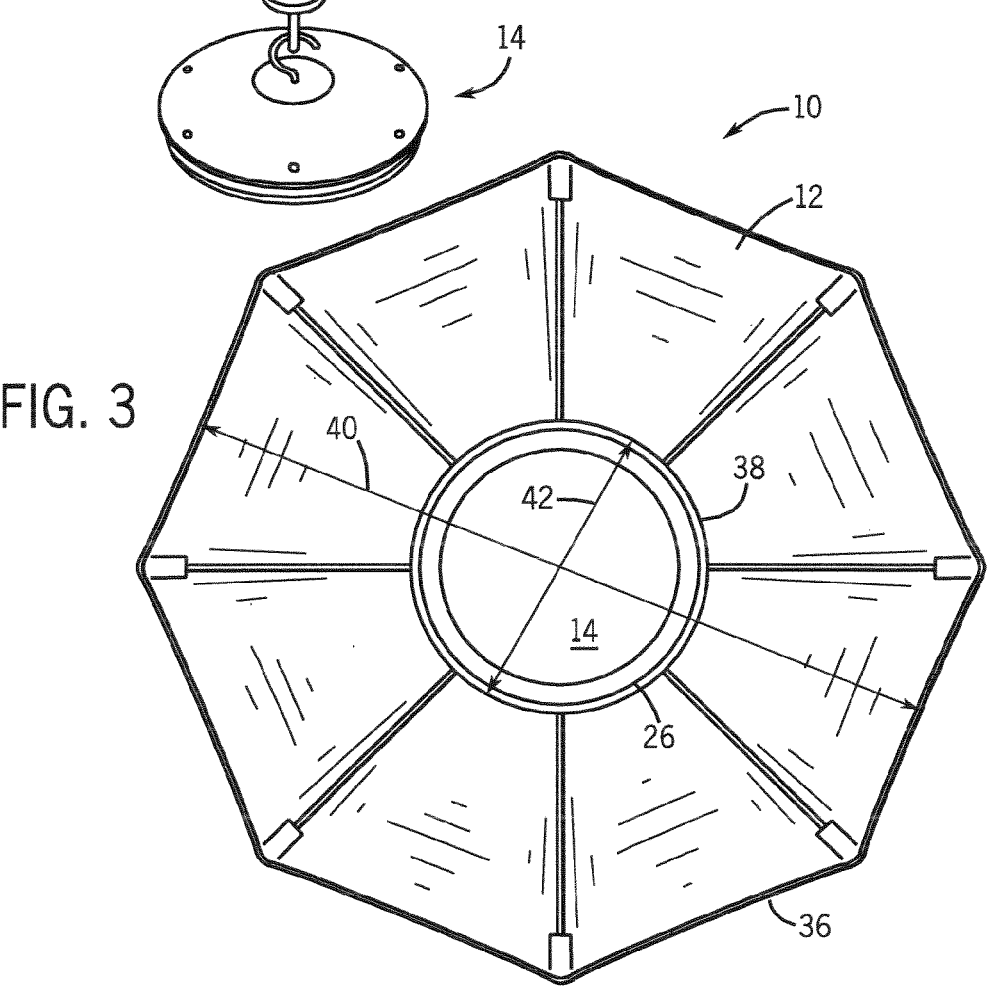
FIG. 3 is a bottom view of the feeder assembly shown in FIG. 1.

Referring to FIG. 3, reservoir 14 is shown as being generally concentric to hood 12. This view shows the footprint of the hood as well as the footprint of the reservoir. The area of the footprint of the hood in the illustrated embodiment is shown to be approximately six times greater than the area of the footprint of the reservoir. However, it is understood that multiple variations of this configuration are within the scope of the present invention. Additionally, FIG. 3 shows the perimeter 36 of hood 12 as having an octagonal shape positioned about a perimeter 38 of reservoir 14. It is understood, and within the scope of the claims, that the hood and/or a reservoir may have other shapes than that shown.

Figure 4:
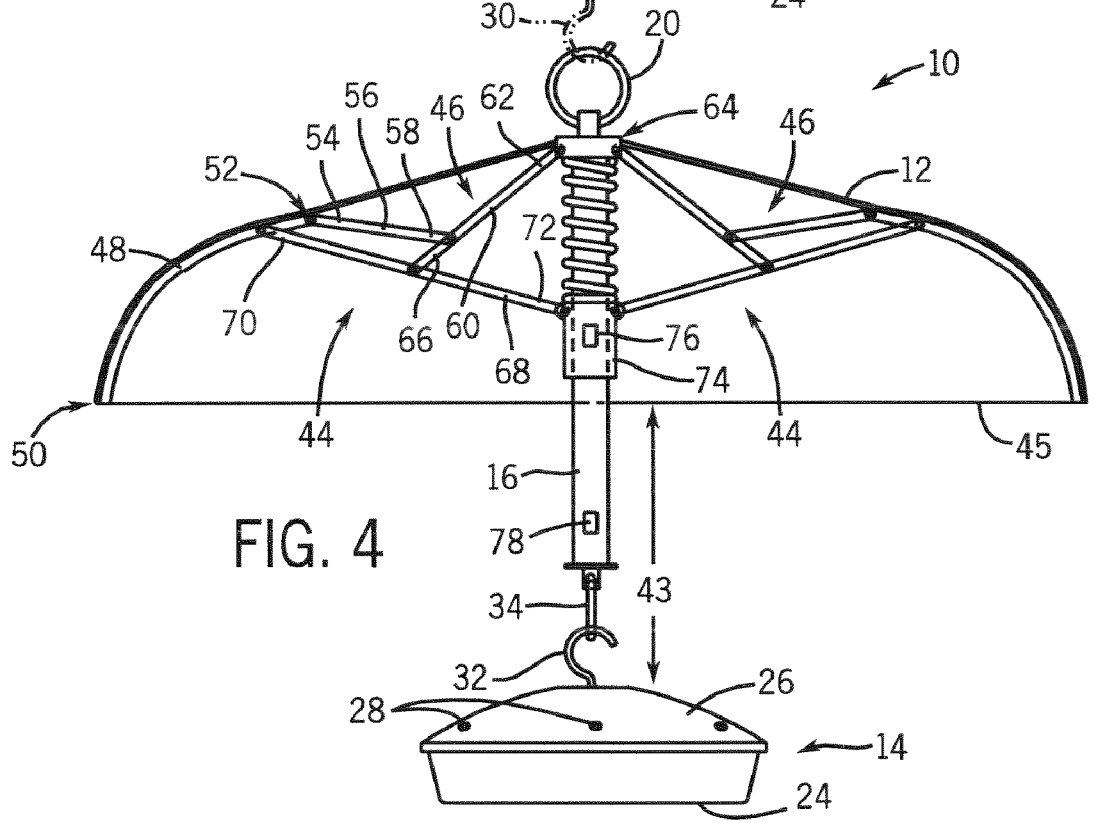
FIG. 4 is an elevational view of the feeder assembly shown in FIG. 2 with the hood shown in cross-section and in an extended position.

The perimeter 36 of the hood 12 and the perimeter 38 of the reservoir 14 form a first ratio. This ratio is used to determine the construction of the feeder. The ratio relates to both the amount of protection the hood 12 provides the reservoir 14 from direct sunlight or rain and the amount of clearance between the reservoir 14 and the hood 12 afforded animals that utilize the feeder. Preferably, a diameter 40 of hood 12 is at least twice a diameter 42 of the reservoir 14. Additionally, reservoir 14 is constructed to suspend a distance 43, as best shown in FIG. 4, below a lowermost edge 45 of hood 12. This allows sufficient clearance for the animals to access the feed and allows hood 12 to be collapsed about center post 16 with reservoir 14 attached thereto.

FIG. 4 shows feed assembly 10 with hood 12 in cross-section. Hood 12 is connected to center post 16 by a linkage assembly 44. Linkage assembly 44 includes a plurality of sets links 46 interconnecting hood 12 to center post 16 of feed assembly 10. For brevity, only one set of links will be discussed hereafter. Each set of links 46 includes a first link 48 having a first end 50 connected to hood 12 proximate base 45. A second end 52 of first link 48 is pivotably connected to a first end 54 of a first folding member 56. A second end 58 of first folding member 56 is pivotably connected to a second folding member 60. A first end 62 of second folding member 60 is pivotably connected to an upper end 64 of center post 16. A second end 66 of second folding member 60 is pivotably connected to an extension member 68 of linkage assembly 44. Extension member 68 has a first end 70 pivotably connected to first link 48 and a second end 72 pivotably connected to an actuator 74 slidably connected to center post 16. The umbrella-like hood forms a collapsible shade for protection of reservoir 14 against weather conditions.

Center post 16 includes an extended locking tab 76 and an optional collapsed locking tab 78. Locking tabs 76, 78 are constructed to engage actuator 74 and retain shade 12 in an extended position, shown in FIG. 4, and in a collapsed position, shown in FIG. 6, respectively. Referring to FIG. 5, when actuator 74 is disengaged from extended locking tab 76, a spring 80 biases shade 12 toward the collapsed position shown in FIG. 6. Still referring to FIG. 5, as actuator 74 is moved along center post 16 from extended locking tab 76 to collapsed locking tab 78, each link of linkage assembly 44 generally aligns with center post 16. Additionally, the cooperation of folding members 56, 60 reduces the overall collapsed length of linkage assembly. It is understood that rather than including the multiple link linkage assembly as shown, a collapsible hood could be provided with a different linkage assembly such as one link connecting the hood to the center post and a second link connecting the actuator to the first link. Such modifications are within the scope of claims. Furthermore, when actuator 74 is released from extended locking tab 76 and axially displaced along center post 16, first link 48 is allowed to deflect to a generally straight orientation, as shown in FIG. 5, as compared to the fully extended orientation of first link 48 shown in FIG. 4. Simply stated, in the extended position, shown in FIG. 4, first link 48 deflects in response to the forces exerted thereon by hood 12 and the linkage assembly attached thereto.

As shown in FIG. 6, in the fully retracted position, hood 12 is collapsed about center post 16. A strap 82 extends around hood 12 and provides a relatively compact collapsed orientation of hood 12. Such a construction provides a collapsible shade assembly moveable between an open and a closed position that occupies relatively minimal space when closed as during transportation or storage. Although the collapsible hood assembly of the present invention is shown to have an actuator that is slidably connected about center post 16, it is understood and within the scope of the claims to have an actuator assembly that is internal to center post 16 and operable by loop 34. Accordingly, a feeder assembly according to the present invention provides a user with a selectively operable means for protecting the feed contained therein. Should the hood be connected to a feed container constructed to hold dry-feed, the hood can be extended during periods of inclement weather, such as rain, to maintain the integrity of the feed contained therein and retracted or collapsed during sunny or overcast days to maximize the visibility of the feed container to desired animals or birds. Should the feed container be constructed to attract and feed hummingbirds, the collapsible hood can be extended during both rainy weather and periods of feeder exposure to direct sunlight. Such operation of the collapsible hood maintains the concentration of the feed solution and reduces the exposure of the feed solution to spoilage causing sunlight.

It is understood that both the hood and the reservoir can be decorated in such a manner as to increase the feeder's ability to attract a desired audience of hungry animals. Through the application of both bright colors and flower patterns, the feeder can be constructed to more efficiently attract hummingbirds or visually appeal to the feeder's owner. Similarly, the feeder could be decorated with a pattern to resemble dry-feed to attract other dry-feed feeding animals or birds.

Therefore, one embodiment of the present invention has a feeder assembly that includes a feed container and a post having first and second ends, wherein the first end extends upwardly from the feed container. The feeder assembly includes a shade pivotally attached about the second end of the post and movable between an open position and a closed position.

Another embodiment of the present invention has a bird feeding apparatus that includes a hummingbird feeder having a liquid reservoir. The liquid reservoir has a plurality of openings to only accommodate feeding by a hummingbird. The apparatus includes a collapsible hood positioned over the liquid reservoir and constructed to shade the liquid reservoir from direct sunlight. The bird feeding apparatus has a post connecting the liquid reservoir to the collapsible hood and a slider connected to the collapsible hood. The slider is movably connected to the center post and operable to open and close the collapsible hood.

According to another embodiment of the present invention, a bird feeder device includes a feeder having a reservoir constructed to feed hummingbirds. The device includes an umbrella connected to the feeder and extendable between a closed position and an open position generally above the reservoir.

A further embodiment to of the present invention has bird feeder that includes means for retaining a sugar solution, means for providing shade to the means for retaining sugar solution, and means for operatively extending and retracting the shade providing means.

The present invention has been described in terms of the preferred embodiment, and it is recognized that equivalents, alternatives, and modifications, aside from those expressly stated, are possible and within the scope of the appending claims.

What is claimed is:

1. A feeder assembly comprising;
   a feed container;
   a post having first and second ends, wherein the first end extends upwardly from the feed container;
   a shade pivotally attached about the second end of the post and movable between an open position and a closed position; and
   wherein the feed container is suspended from the first end of the post.

2. The feeder assembly of claim 1 further comprising a linkage assembly attached to the shade and having an actuator slidably connected to the post.

3. The feeder assembly of claim 2 further comprising a latch extending from the post and engageable with the actuator and constructed to lock the linkage assembly when the shade is in the open position.

4. The feeder assembly of claim 2 wherein the linkage assembly further comprises a first link connected to the shade and pivotably connected to a second link, the second link pivotably connected to the first link and the actuator.

5. The feeder assembly of claim 1 wherein the feed container is a reservoir constructed to contain a fluid and accommodate feeding of a hummingbird.

6. The feeder assembly of claim 5 wherein the reservoir is decorated to attract hummingbirds.

7. The feeder assembly of claim 1 wherein the post is a center post and has a length such that the feed container does not interfere with movement of the shade between the open position and the closed position and the feed container is removably connected the post.

8. The feeder assembly of claim 1 wherein the post extends from a center of the feed container and is attached to a center of the shade.

9. The feeder assembly of claim 1 wherein the shade extends from the post in the open position and collapses about the post in the closed position.

10. A bird feeding apparatus comprising:
a hummingbird feeder having a liquid reservoir, the liquid reservoir having therein a plurality of openings to only accommodate feeding by a hummingbird;
a collapsible hood positioned over the liquid reservoir and constructed to shade the liquid reservoir from direct sunlight;
a post connecting the liquid reservoir to the collapsible hood; and
a slider connected to the collapsible hood and movably connected to the center post and operable to open and close the collapsible hood.

11. The bird feeding apparatus of claim 10 wherein the collapsible hood has a profile that is larger than a profile of the liquid reservoir.

12. The bird feeding apparatus of clam 10 further comprising a linkage mechanism connected to the collapsible hood and pivotally connected to the slider.

13. The bird feeding apparatus of claim 10 wherein the collapsible hood is opaque and has an extended diameter that is at least twice as large as the diameter of the liquid reservoir.

14. The bird feeding apparatus of claim 10 wherein the collapsible hood moves between an extended position and a retracted position by movement of the slider.

15. The bird feeding apparatus of claim 10 wherein the center post further comprises a loop constructed to removably support the liquid reservoir.

16. The bird feeding apparatus of claim 10 wherein the liquid reservoir is colored to attract hummingbirds.

17. The bird feeding apparatus of claim 10 wherein the liquid reservoir further comprises a lid attached to a base, the lid having a plurality of openings constructed to accept passage of a hummingbird beak therethrough.

18. The bird feeding apparatus of claim 10 wherein the collapsible hood further comprises a plurality of radially extendable and retractable ribs.

19. A bird feeder device comprising:
a feeder having a reservoir constructed to feed hummingbirds and comprising a lid and a base, the lid having a plurality of openings to only accommodate feeding by a hummingbird; and
an umbrella connected to the feeder and extendable between a closed position and an open position generally above the reservoir.

20. The bird feeder device of claim 19 wherein the umbrella is opaque.

21. The bird feeder device of claim 19 further comprising a center post connected to the reservoir and extending therefrom and wherein the umbrella includes a shuttle slidably connected to the center post and pivotably connected to the umbrella.

22. The bird feeder device of claim 19 wherein the umbrella is decorated to attract hummingbirds.

23. The bird feeder device of claim 19 wherein the reservoir is decorated to attract hummingbirds.

24. The bird feeder device of claim 23 wherein the umbrella is red.

25. The bird feeder device of claim 19 wherein the umbrella further comprises a plurality of pivotably connected links constructed to open and close the umbrella.

26. A bird feeder comprising:
means for retaining a sugar solution, the means having a plurality of holes allowing only feeding of hummingbirds;
means for providing shade to the means for retaining sugar solution; and
means for operatively extending and retracting the shade providing means.

27. The bird feeder of claim 26 wherein the means for providing shade is opaque.

28. The bird feeder of claim 26 wherein at least one of the means for providing shade and the means for retaining sugar solution is colored to attract hummingbirds.

29. The bird feeder of claim 26 wherein the means for retaining sugar solution is removeably connected to the means for providing shade.

30. The bird feeder of claim 26 wherein the means for operatively extending and retracting the shade providing means further comprises means for locking a position of the shade providing means.

31. The bird feeder of claim 26 wherein the means for providing shade is extendable and retractable with the means for retaining sugar solution connected thereto.

* * * * *